No. 628,807. Patented July 11, 1899.
S. K. HUMPHREY.
ELECTRIC CURRENT TRANSFORMER.
(Application filed Oct. 1, 1898.)
(No Model.) 4 Sheets—Sheet 2.

WITNESSES:
Edward Thorpe

INVENTOR
Seth K. Humphrey.
BY
ATTORNEYS.

No. 628,807. Patented July 11, 1899.
S. K. HUMPHREY.
ELECTRIC CURRENT TRANSFORMER.
(Application filed Oct. 1, 1898.)
(No Model.) 4 Sheets—Sheet 3.

WITNESSES: Edward Thorpe
C. R. Ferguson

INVENTOR Seth K. Humphrey
BY
ATTORNEYS.

No. 628,807. Patented July 11, 1899.
S. K. HUMPHREY.
ELECTRIC CURRENT TRANSFORMER.
(Application filed Oct. 1, 1898.)
(No Model.) 4 Sheets—Sheet 4.

WITNESSES
Edward Thorpe
C. R. Ferguson

INVENTOR
Seth K. Humphrey
BY
ATTORNEYS.

UNITED STATES PATENT OFFICE.

SETH KING HUMPHREY, OF BOSTON, MASSACHUSETTS.

ELECTRIC-CURRENT TRANSFORMER.

SPECIFICATION forming part of Letters Patent No. 628,807, dated July 11, 1899.

Application filed October 1, 1898. Serial No. 692,408. (No model.)

*To all whom it may concern:*

Be it known that I, SETH KING HUMPHREY, of Boston, in the county of Suffolk and State of Massachusetts, have invented a new and Improved Electric-Current Transformer, of which the following is a full, clear, and exact description.

This invention relates to an improved device designed to transform multiphase electric currents from one voltage to another and at the same time from alternating to a single direct current without the employment of rotary transformers.

I will describe an electric-current transformer embodying my invention and then point out the novel features in the appended claim.

Reference is to be had to the accompanying drawings, forming a part of this specification, in which—

Figure 1:
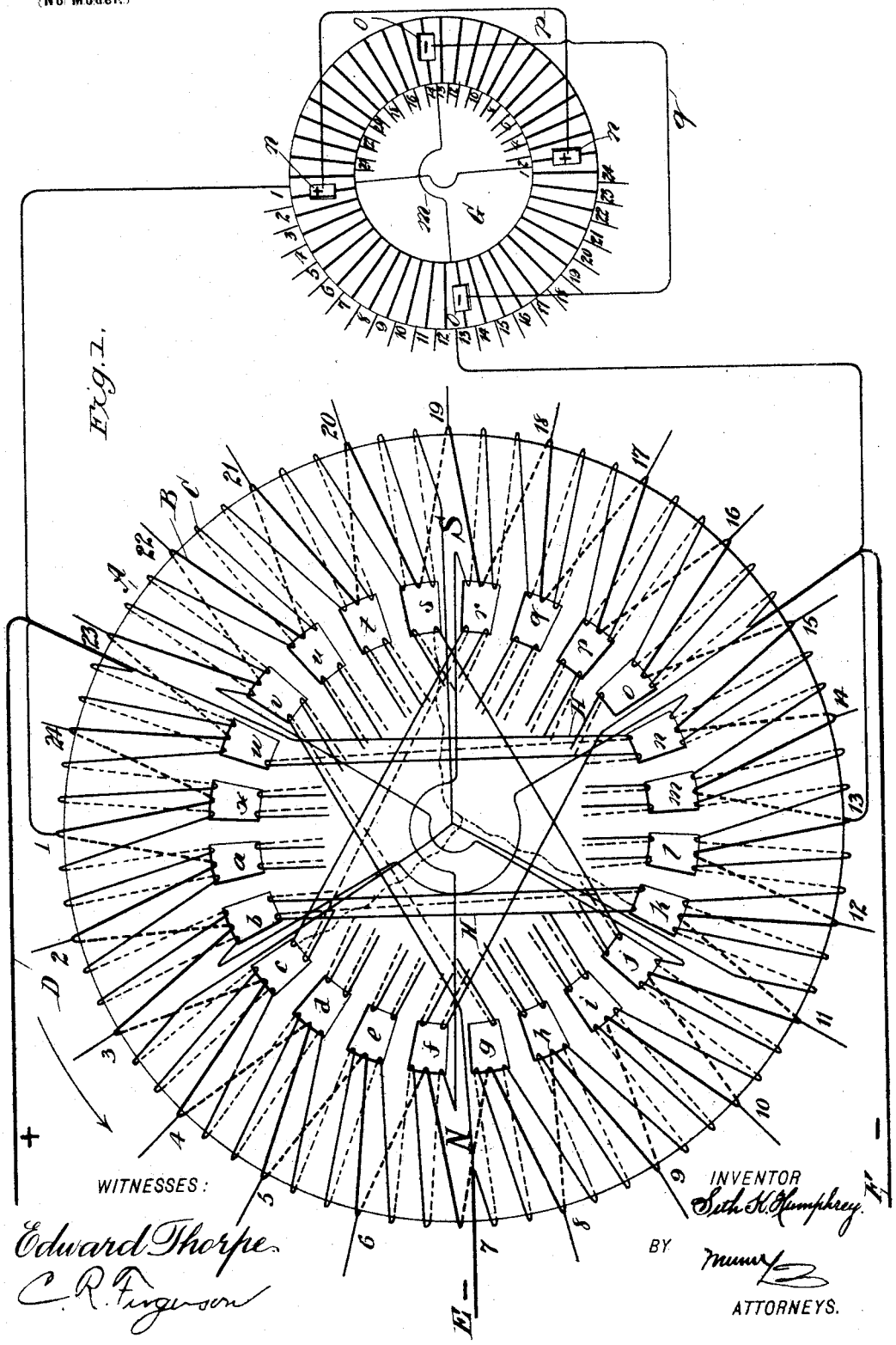
Figure 2:
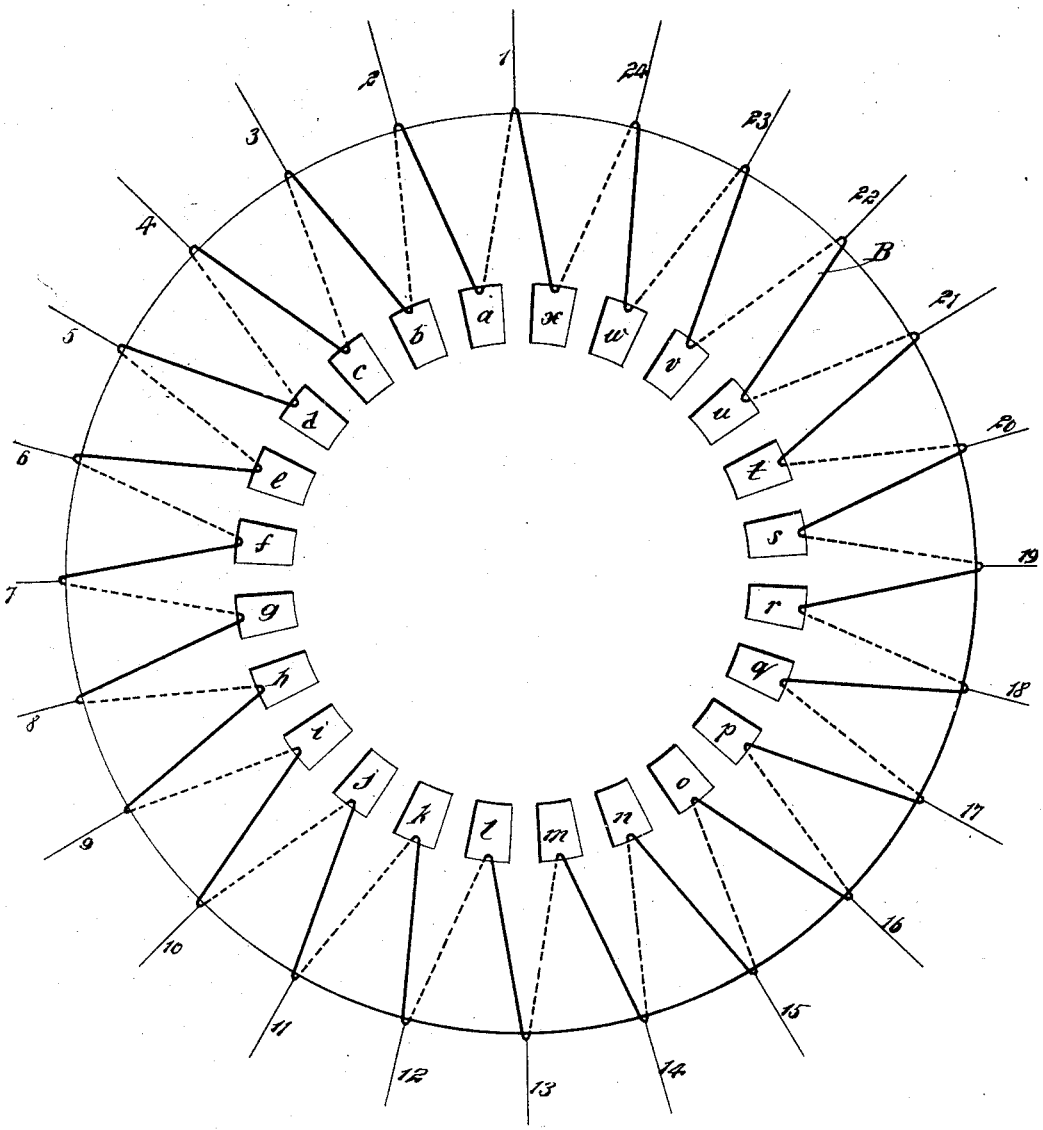
Figure 3:
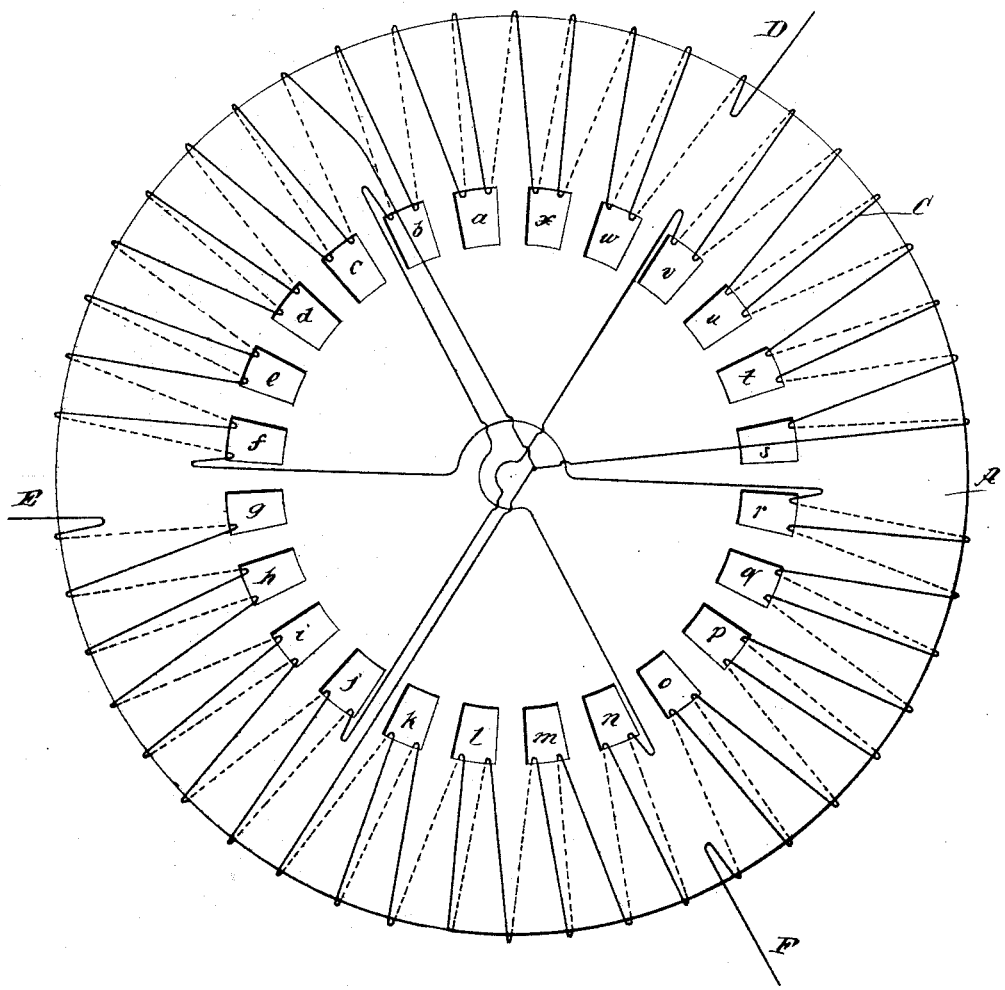
Figure 4:
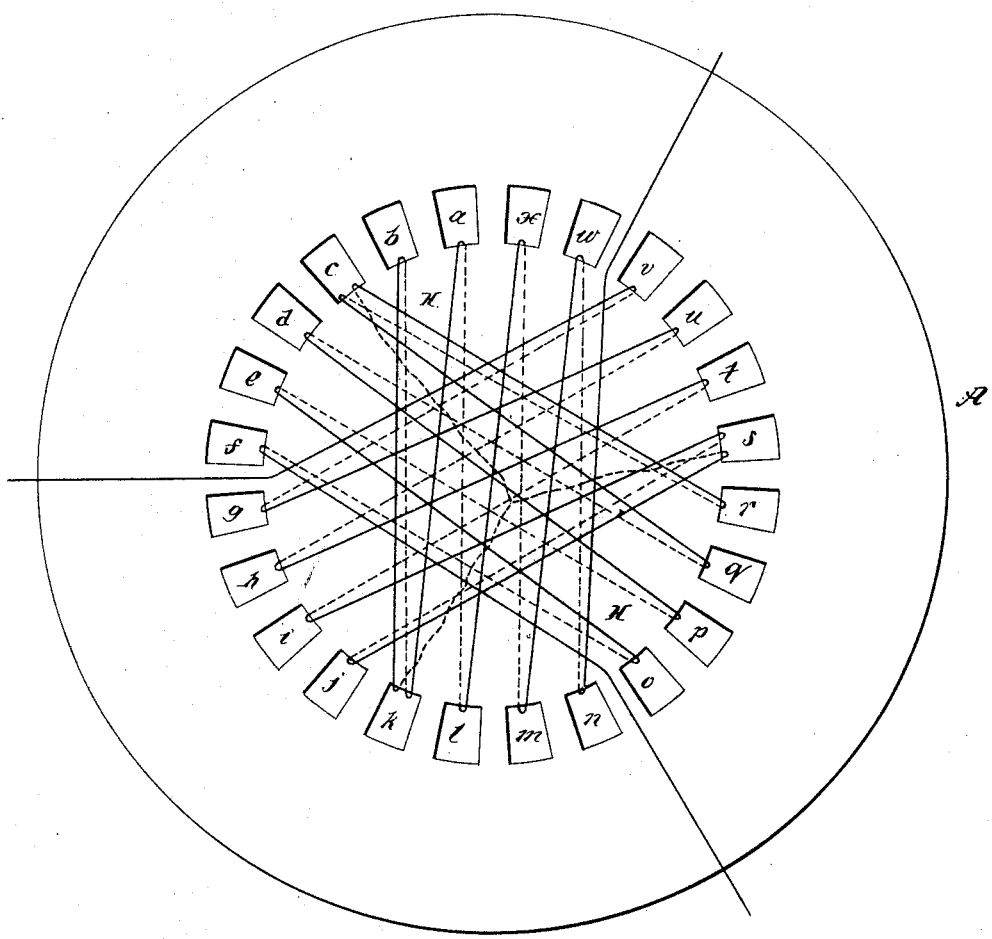

Figure 1 is a diagrammatic view of a transformer embodying my invention, and Figs. 2, 3, and 4 are diagrammatic views, respectively, of the secondary, primary, and auxiliary windings.

For convenience I describe a transformer designed to be connected to a three-phase alternating-current circuit. It consists of a core A, built up of many thicknesses of soft-iron disks, which are electrically insulated from each other. This core is solid, excepting that a series of holes is provided (here shown as twenty-four) through which the windings are threaded. This subdivision of windings would in practice be materially increased and the construction altered to facilitate winding. The heavy lines B represent the secondary circuits, and the light lines C represent the primary circuits. The several windings are through the openings $a$ to $x$, inclusive, and over the periphery of the core. The primary windings have one connection with each of the mains D, E, and F from the generator. Each main is connected in series with a plurality of sections (here shown as six, in groups of two) diametrically opposite each other, and thence the ends are connected together. This gives the well-known rotating magnetic field. Any other connection of the several sections with the mains of any multiphase system that will give a rotating magnetic field can be used.

The secondary is a continuous winding similar to that of a Gramme ring distributed either over, under, or by the side of the several sections of the primary windings, so that both primary and secondary windings have at every coil a common magnetic circuit. The secondary is tapped between each coil at the points numbered, consecutively, from 1 to 24, and the parts so numbered are to be connected with like-numbered segments on the stationary commutator G. I have shown, however, but two of the coils having such connection. In the particular instance shown in the drawings it will be considered that the current in the main D is at its maximum positive flow and the mains E F are equally negative. This creates a positive pole at N and a negative pole at S, and the magnetic flux is from the neighborhood of N between the coils extended through the openings $e\,f\,g\,h$, &c., and across the center of the transformer to enter between the coils through the openings $q\,r\,s\,t$, &c. The rotation of the flux being shown as left-handed, this induces a current in the secondary at both N and S upward from the coil 13 to the coil 1 on both sides of the transformer, the action being very similar to that in the armature of a direct-current dynamo. The magnetic flux is from N to S, and as the coils 1 and 13 of the secondary are cutting practically no lines of force at this instant these are the neutral points of greatest difference of potential. As the field rotates, the points having the greatest difference of potential travel successively from 1 to 2 3, &c., and from 13 to 14 15, &c., and being connected to the stationary commutator G create on the commutator a left-handed rotating potential.

I have shown the commutator as having twice as many segments as there are coils in the transformer. They are cross-connected, as at $m$, so that the rotating potential in the commutator rotates one-half as fast as the rotating magnetic field in the transformer. This ratio of commutator-segments to transformer-coils can be altered to suit circumstances; but for the purpose of gathering the current by rotating brushes against the commutator it is generally necessary to reduce the speed of rotation of potential. In the particular instance shown the points of greatest difference of potential being 1 and 13 in the transformer there are two pairs of brushes $n$ $n$ and $o$ $o$, covering corresponding segments of the commutator, said brushes being cross-connected, as at $p$ $q$, and each pair is designed to be connected to a collecting-ring on the shaft of the motor driving them, from which rings stationary brushes will take the direct current. The motor used (not shown) to carry these brushes would be a synchronous four-pole motor run from the same three-phase mains. The commutator-dial should have an adjusting motion through a small arc to get the brushes to coincide with the points of greatest difference of potential while running. The coils momentarily short-circuited by the brushes are at their neutral points, and reactions in these coils, as well as in other parts of the transformer, as I have heretofore stated, will be very similar to those in a direct-current dynamo.

So far I have described only the transformer primary and secondary coils, which are interlinked upon the periphery of the transformer. As above stated, the primary current at the instant shown tends to create a magnetic flux from N to S; but the secondary current from 13 to 1 on both sides of the transformer tends to send magnetic flux from between the coils extended through $a$ and $x$ across the center to enter between the coils extended through $l$ and $m$, thus tending to create a magnetic field at right angles to the transformer field. The primary coils would of course take additional current to overcome the distorting effect of this secondary field; but in order to assist the primary winding in maintaining a rotating magnetic field of uniform speed and intensity I place an auxiliary rotating field-winding H from each of the three generator-mains across the center of the transformer, as shown, similar to and in parallel with the periphery-windings. These windings are opposite to the primary transformer-windings, and thus create a rotating magnetic flux, which at the instant shown is from N to S and always coincides with the magnetic flux due to the primary windings on the periphery. As this auxiliary winding is not interlinked in any way with the secondary, it will have no effect upon the ratio of transformation; but its function is similar to that of the field-magnets in a rotating transformer in that it exerts a powerful directional influence on the rotating field.

One of the distinctive features of this device is the arrangement of the coils in sections with each section having a complete iron magnetic circuit of its own. The coils 1 2 24 and 12, 13, and 14 are cutting very few lines of force, and as the difference of potential between 1 and 13 is created by the intensity of the magnetic flux across the center from N to S without regard to whether said lines of force flow between the coils $b$ and $c$, $j$ and $h$, or between any intermediate coils, this difference of potential is proportional to the total number of lines of force and can vary only as the intensity of magnetization varies. It has been conclusively shown that the intensity of magnetization in a rotating field created by a well-balanced multiphase system is practically constant. Therefore the rotating potential is constant and when gathered at the commutator-rings on the synchronous motor will give a constant-potential direct current subject only to the drop caused by an increased demand on the circuit for current.

Having thus described my invention, I claim as new and desire to secure by Letters Patent—

A transformer, comprising a core consisting of a disk having a series of openings through it, a multiplicity of primaries rove through said openings and over the periphery of the disk, the said primaries being arranged in a plurality of sets placed opposite each other and connected, one set, with the opposite set, a continuous secondary winding consisting of a series of coils, each having connection with segments of a stationary commutator, and auxiliary windings extended across the center of the disk and connected in parallel with the primaries, substantially as specified.

SETH KING HUMPHREY.

Witnesses:
 EFFIE LORD,
 E. G. ODION.